Patented Jan. 26, 1954

UNITED STATES PATENT OFFICE 2,667,442

MERCURIAL DIURETIC

Albert Schlesinger, Nathan Weiner, and Samuel M. Gordon, New York, N. Y., assignors to Endo Products, Inc., Richmond Hill, N. Y., a corporation of New York No Drawing. Application November 6, 1948, Serial No. 58,784

7 Claims. (Cl. 167—71)

This invention relates to and has for its principal object the provision of a novel derivative of courmarin-3-carboxylic acid, and in particular is directed to a mercurated derivative of 8-allyl-coumarin-3 carboxylic acid; and methods of preparation of such derivatives and intermediates used to prepare the same.

This novel compound is particularly effective as a diuretic.

It has been customary, heretofore, to use mercurated compounds, either per se or in combination with theophylline, to effectuate diuresis. The products used for producing diuresis have been administered either by intravenous or preferably by intramuscular injection and the use thereof requires careful supervision in order to make certain that side effects are avoided. The known products are administered in solutions usually having a pH ranging from 8 to 10. Furthermore, the mercuration of compounds having an allyl group (the allyl group usually being a substituent of one of the hydrogen atoms of an amino or amido group) yields compounds which very slowly undergo continued decomposition with the release of mercury. Such decomposition continues over a period extending from about three months to nine months and therefore the solutions of such mercurial diuretics must be aged until they become completely stable. It is not uncommon, despite such period of aging, for the separation of mercury to persist, as may be observed in the ampules.

Accordingly, it is among the principal object of this invention to provide a mercurial diuretic which, in solution for administration, has a pH that is but slightly above neutrality.

Another object of the invention is the provision of a mercurial diuretic which does not require aging and may, shortly after preparation, be put up in ampules.

Further objects and advantages will be apparent from the more detailed description of the invention hereinafter set forth, such objects and advantages being achieved from a mercurated derivative of 8-allyl-courmarin-3 carboxylic acid, the parent acid having the formula

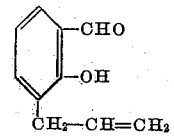

PREPARATION 1

*2-allyloxy-benzaldehyde* having the formula—

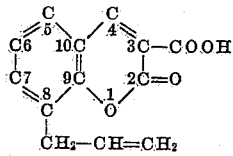

488 grams of salicylaldehyde (4 moles), 560 grams of anhydrous potassium carbonate (K₂CO₃) and 484 grams of freshly distilled allyl bromide are well mixed with 650 cc. of anhydrous ethanol in a 5 liter round-bottomed flask and refluxed, preferably with stirring, for four hours. After cooling to room temperature, 4 liters of cold water are added and the mixture is extracted two times with 500 cc. portions of ether. The ether-solution is dried over anhydrous calcium sulfate, filtered, and the ether evaporated on the steam bath. There remain 614 grams of raw material which is distilled at 130° C. (at 10 mm. pressure) to yield 580 grams of pure 2-allyloxy-benzaldehyde in a 90% yield.

It is to be noted that sodium carbonate may be used, but it gives poorer yields than does potassium carbonate; also that the allyl bromide must be freshly distilled.

PREPARATION 2

*3-allyl-2-hydroxy-benzaldehyde* having the formula—

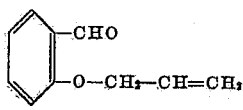

The 2-allyloxy-benzaldehyde, the product of Preparation 1, is placed in a 3 liter, round-bottom flask, provided with a reflux condenser and thermometer, and is heated slowly to 210°–220° C. on a Glas-col heater. At this temperature an exothermic reaction takes place and the external heating is immediately interrupted until the reaction becomes smoother; and then the reaction mixture is heated again on the Glas-col heater so that the temperature of the product remains for one hour at 225°–230° C. After cooling to 50° C., the product, the 3-allyl-2-hydroxy-benzaldehyde, is distilled in vacuum at 111° C. (10 mm.). It may be distilled at 85°–95° C. at 3 mm.

520 grams of 3-allyl-2-hydroxy-benzaldehyde is obtained in an 80% yield.

PREPARATION 3

*8-allyl-coumarin-3-carboxylic acid*

375 grams (3.9 moles) of monochloracetic acid are placed in a 5 liter flask. To this are added 360 cc. of water and 210 grams of sodium carbonate, Na₂CO₃. The mixture is stirred until the reaction becomes smooth, and it is then heated to 40° C. Neutralization is completed by adding sodium carbonate solution till the mixture is neutral to litmus. The flask is transported to a hood and a solution of 210 grams of sodium cyanide (or 266 grams of potassium cyanide) in 450 cc. of water at 40°–50° C. is added thereto. The temperature of the mixture rises to 100° C. Directly at this moment, ice (about 100–200 grams) is added, so that the temperature is immediately reduced. After cooling to 50° C., a solution of 486 grams (3 moles) of 3-allyl-2-hydroxy-benzaldehyde, Preparation 2, in 1000 cc. of water and 125 grams of sodium hydroxide (also at 50° C.) are added. The solution is filtered over glass wool and allowed to stand at room temperature for 24 hours. The mixture is now cooled in ice, and with stirring, concentrated hydrochloric acid is added until it is acid to Congo red with the formation of a crystalline, yellow-colored precipitate which is 3-allyl-2-hydroxy phenyl-1-(beta-cyano)-acrylic acid. Then an additional 3.5 liters of hydrochloric acid is added to yield a 4% solution of hydrochloric acid, and the same heated for three hours at 70°–80° C. with stirring. Such treatment results in the formation of the 8-allyl-coumarin-3-carboxylic acid.

After cooling in ice, the 8-allyl-coumarin-3-carboxylic acid is filtered on a Buchner funnel, washed with 200–300 cc. of cold water, and recrystallized twice from 3.5 liters of methanol with the aid of charcoal. The pure product is washed with cold methanol, then with ether, and dried in a desiccator. The product has a melting point of 147° C., is a light yellow powder, and was obtained in a yield of 345 grams (50%).

The preparation of the 8-allyl-coumarin-3-carboxylic acid was previously reported by F. v. Werder (Chemical Abstracts, volume 31, page 2742). He prepared this acid by reacting 3-allyl-2-hydroxy-benzaldehyde with diethyl malonate, $CH_2(COOEt)_2$, an expensive product, to obtain the ethyl ester of the 8-allyl-coumarin-3-carboxylic acid as an intermediate which must be isolated. This isolated intermediate is then subsequently saponified to produce the 8-allyl-coumarin-3-carboxylic acid which is obtained in a poor yield.

Our new method, above described, for the preparation of the 8-allyl-coumarin-3-carboxylic acid, enables one to use inexpensive chemicals and obviates the need for the isolation of the intermediate product, i. e., the 3-allyl-2-hydroxy phenyl-1-(beta-cyano)-acrylic acid.

If it is desired, however, to isolate the above intermediate, when it is first precipitated as described above, such precipitate is filtered on a Buchner filter and washed well with cold water.

EXAMPLE 1

8-(2'-methoxy-3'-hydroxy mercuri) propyl-coumarin-3-carboxylic acid having the formula—

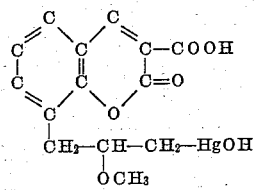

A solution of 115 grams (0.5 mole) of 8-allyl-coumarin-3-carboxylic acid in 3000 cc. of methanol are placed in a five liter flask provided with a stirrer and a dropping funnel. Into the stirred solution there is slowly dropped, during 2-3 hours, a solution of 160 grams of mercuric acetate in 2000 cc. of methanol. The temperature is maintained between 20°–25° C. The mercuric compound, having the above formula, precipitates as a light yellow powder as the mercuric acetate solution is added. After all of the mercuric acetate solution is added, stirring is continued for one hour. The solid is filtered on a Buchner funnel. The precipitate is washed four times with 100 cc. portions of methanol and then with 100 cc. of ether and dried in a desiccator. It is obtained in a yield of 250 grams (96%) and has a melting point of 155°–160° C.

EXAMPLE 2

8-[2'-methoxy-3'-(7-theophyllinyl)]-propyl-coumarin-3-carboxylic acid-sodium having the formula—

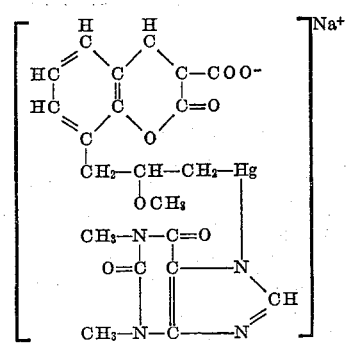

9.9 grams of theophylline (U. S. P. XIII) and 9 grams of sodium bicarbonate are dissolved in about 200 cc. of distilled water by heating on the steam bath and then 26 grams of the mercury compound of Example 1 is added in small portions with stirring. After all the acid is added, the solution is heated to 100° C. for one minute and then cooled in a cold water bath and then filtered. The clear solution is evaporated under vacuum. To avoid the formation of foam, there are added 50 cc. of toluol. Near the end of the distillation 50 cc. of toluol are added again, to remove the rest of the water. The residue is powdered and dried in a desiccator over $P_2O_5$. There are thus obtained 36 grams of the new complex compound, the product of this example, as a dry, light yellow powder which is very soluble in water to produce a clear solution.

EXAMPLE 3

Injectible solutions of 8-[2'-methoxy-3'-(7-theophyllinyl mercuri)] propyl-coumarin-3-carboxylic acid-sodium (a) 100 grams of the mercury compound, product of Example 1, and 40 grams of sodium bicarbonate are placed in a five liter flask. Then 800 cc. of distilled water are added to the flask and the mixture is stirred slowly and heated to 40°–45° C. Carbon dioxide is liberated and care must be taken while heating and stirring. Then 50 grams of theophylline, in 5 gram portions, are added during a period of one hour to the mixture. Each of the 5 gram portions is added after the foaming subsides. When the foam has almost completely subsided, the slow stirring is continued and the mixture heated to 95°–99° C. (just below boiling) to effect complete solution. After the solution is complete, the mixture is cooled to room temperature and distilled water added in amount sufficient to make up one liter.

This solution has a pH of about 8.36. It is stored in a tightly closed container at room temperature, well protected from light, for 48 hours.

(b) Using the same quantities of the mercury compound, the theophylline and sodium bicarbonate, as in (a) above, with the addition, however, of 4 grams of sodium biphosphate made up to a solution of one liter, there is obtained a solution having a pH of 7.9.

(c) When the quantity of sodium biphosphate added to the mixture of (a) above is increased respectively to 8, 12 and 16 grams, the pH of the solutions are respectively 7.6, 7.4 and 7.3.

Each of the foregoing solutions was aged for 8 days and then put up in ampules. The ampule solution is a markedly superior mercurial diuretic. It may be administered with far greater safety than old compositions. Although it has not as yet been ascertained why this new mercurial diuretic has such remarkable stability, as contrasted with the old mercurial diuretics, it is believed that such stability may be due to the fact that the mercury is positioned in the propyl group, which is linked directly to the stable aromatic nucleus of the molecule, whereas in the old compounds the mercury is positioned in a propyl group which is linked to nitrogen and forms part of the rather highly reactive amido group.

The combination of the theophylline with the mercuric compound is advantageous in that the theophylline is also a mild diuretic and at the same time acts upon the cardiovascular system, producing a protection against any untoward action of the mercury on the tubules of the kidney. It is found that therapeutically, the mercury compound with the theophylline is more effective and less irritating on injection than the mercury compound alone. The theophylline in the mercuric compound solution is also advantageous in that it serves as a stabilizer for the solution. It was observed that of two solutions of the mercuric compound prepared under the same conditions, with the same pH, one without theophylline showed precipitation after four weeks, but that with theophylline was stable after 18 months.

The mercury compound and the theophylline are combined in the molar ratio of approximately 1 of the mercury compound to 1.3 of theophylline.

It will be understood that the foregoing examples are but illustrative of the means of accomplishing this invention and, accordingly, the appended claims are to be construed as defining the invention within the full spirit and scope thereof.

We claim:

1. Compounds of the group consisting of (a) 8(2'methoxy - 3'-hydroxy mercuri-propyl)-coumarin-3-carboxylic acid having the formula:

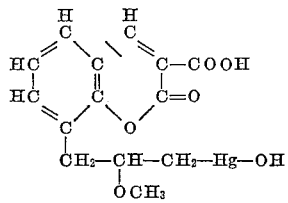

(b) the theophylline addition complex of said acid having the formula:

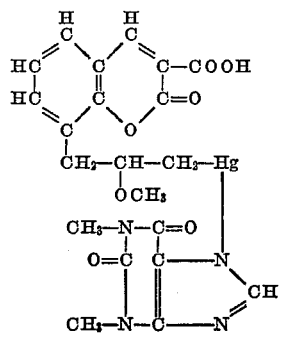

and (c) the alkali metal salts of said addition complex.

2. 8 - [2' - methoxy-3'-(7 - theophyllinyl mercuri)] propyl - coumarin - 3 - carboxylic acid-sodium, having the formula:

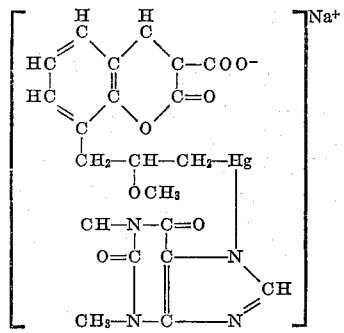

3. A composition for use as a diuretic comprising: the compound of claim 2.

4. A composition for use as a diuretic comprising: an aqueous solution of the compound (a) of claim 1 and theophylline in the respective molar ratios of 2.5:1.

5. A composition for use as a diuretic comprising: the compound (a) of claim 1, theophylline and a buffer.

6. A composition for use as a diuretic comprising: an aqueous solution of the compound (a) of claim 1 and theophylline in the respective molar ratios of 1:1; and a buffer.

7. Method of preparing the compound (a) of claim 1 which comprises: reacting 8-allyl-coumarin-3-carboxylic acid with a solution of mercuric acetate in methanol.

ALBERT SCHLESINGER.
NATHAN WEINER.
SAMUEL M. GORDON.

References Cited in the file of this patent

UNITED STATES PATENTS

| Number | Name | Date |
|---|---|---|
| 1,693,432 | Bockmuhl | Nov. 27, 1928 |
| 1,948,179 | Lautenschlager | Feb. 20, 1934 |
| 2,094,000 | Dolmer | Sept. 28, 1936 |
| 2,433,765 | Krantz | Dec. 30, 1947 |

OTHER REFERENCES

Werder—C. A. volume 31, page 2742.

Whitmore—Organic Compounds of Mercury—pages 31 to 33.

The Chemical Catalog Company, Inc., New York city, 1921.

New and Nonofficial Remedies 1947 J. A. M. A., J. P. Lippincott, Philadelphia, pages 298 to 302.